United States Patent [19]

Hattori

[11] 4,244,033

[45] Jan. 6, 1981

[54] METHOD AND SYSTEM FOR OPERATING AN ASSOCIATIVE MEMORY

[75] Inventor: Akira Hattori, Yokohama, Japan

[73] Assignee: Fujitsu Limited, Kawasaki, Japan

[21] Appl. No.: 967,591

[22] Filed: Dec. 8, 1978

[30] Foreign Application Priority Data

Dec. 27, 1977 [JP] Japan .............................. 52/158223

[51] Int. Cl.³ ...................... G06F 13/00; G11C 15/00
[52] U.S. Cl. ........................................ 364/900; 365/49
[58] Field of Search ... 364/200 MS File, 900 MS File; 365/49

[56] References Cited

U.S. PATENT DOCUMENTS

| 3,868,642 | 2/1975 | Sachs | 365/49 |
| 4,063,081 | 12/1977 | Handly et al. | 364/200 |

Primary Examiner—Raulfe B. Zache
Attorney, Agent, or Firm—Staas & Halsey

[57] ABSTRACT

A method of operating an associative memory, which is provided for storing information, comprises the steps of extracting necessary information by means of access to said associative memory and updating information retained in the associative memory. In the method and system of the present invention, said associative memory comprises a data portion for storing a plurality of block information units as one module information unit, and an address array portion for storing a module address corresponding to said one module information unit, said associative memory further containing valid information arranged in conjunction with said module address in said address array portion for indicating which of said plural block information units constituting said one module information units is valid. Further, an address, with respect to which said associative memory is retrieved, is subjected to access to the address portion of said associative memory in a field shifted from a field in which said address is compared with an address read out from said address portion, and valid information is allotted in a least significant bit to each of said block information so as to obtain an increased capacity for said associative memory, and updating of information stored in said data portion is carried out in the block information unit.

8 Claims, 9 Drawing Figures

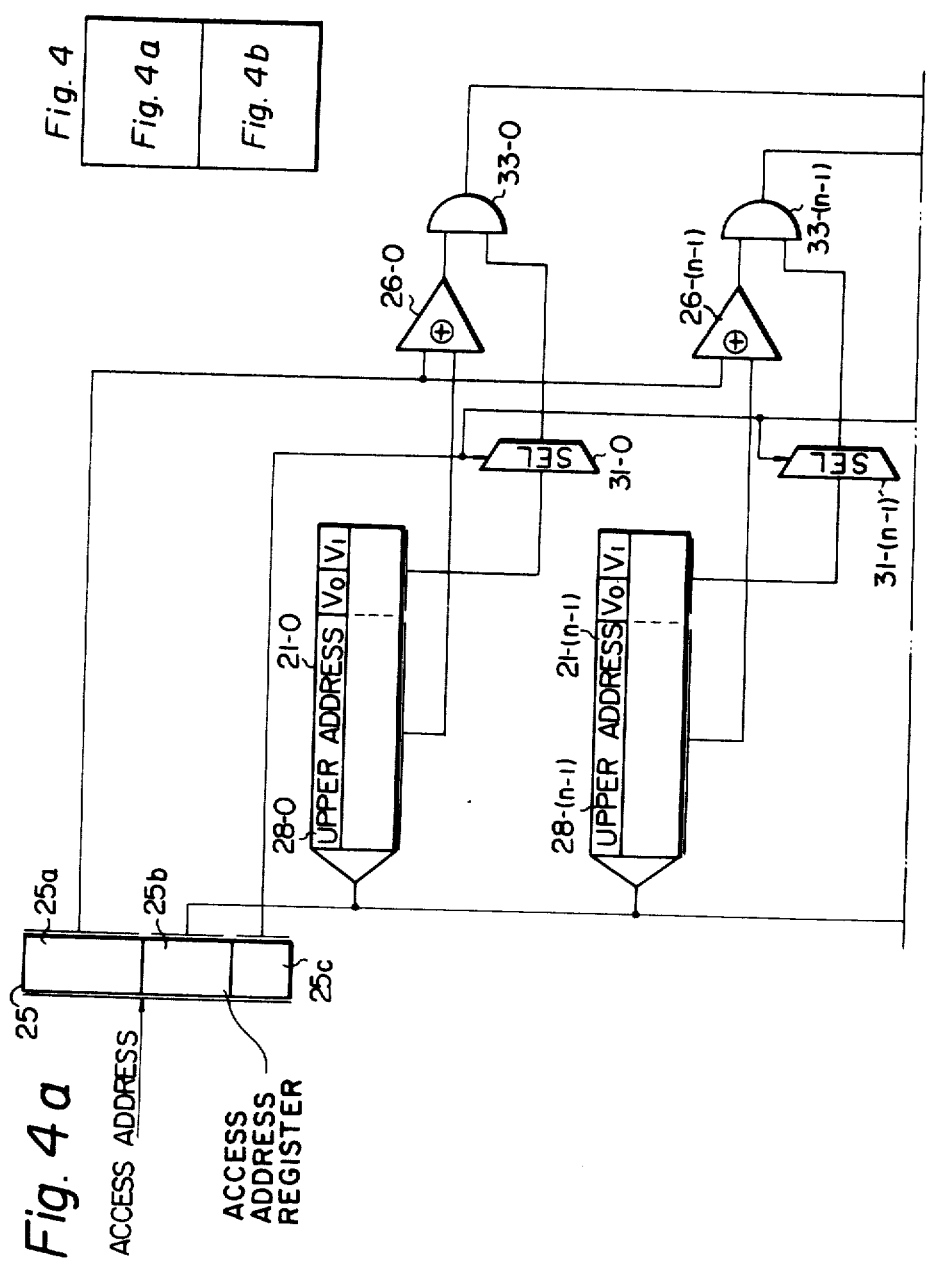

METHOD AND SYSTEM FOR OPERATING AN ASSOCIATIVE MEMORY

FIELD OF THE INVENTION

The present invention relates to a method and system for operating an associative memory which is provided for storing information. The method includes the steps of extracting necessary information by access to said associative memory and updating the information retained in said associative memory.

BACKGROUND OF THE INVENTION

The conventional associative memory system, such as a cache memory, is such that information stored in the main memory is previously transferred to an associative memory (hereinafter called "buffer memory") and, then, an associated processor operates by providing access to said buffer memory. If the necessary information is absent in the buffer memory, the necessary information stored in the main memory is loaded in block format into the buffer memory. That is, updating of information in the buffer memory is carried out. The capacity of such associative memory or buffer memory depends upon parameters, such as the set number, the associative level, and the block size of information stored in block format.

According to the concept relating to the buffer memory used in the conventional associative memory system mentioned above, the larger the amount of information that can be transferred to the buffer memory from the main memory at one time, the lesser the possibility that the necessary information will be found to be missing from the buffer memory during the processing operation, resulting in improved overall efficiency of processing. It is, therefore, desirable to design the capacity of the buffer memory to be as large as possible.

To increase the capacity of such a buffer memory in a conventional system the associative level is increased, for the following reason. While usually, a change in the number of sets or in the block size greatly affects the overall processing system, the value of the associative level need not be increased by a power of 2, namely, twice, four times, ... $2^n$ times, but can be increased sequentially by twice, thrice, ....

However, an increase in the associative levels necessitates a corresponding increase in the number of address comparators required, and complicates the replace circuit used for the updating of information. Also, the addition of one or more address array portions which contain expensive high speed memory elements will become necessary. As for the address array portion in particular, recent superhigh-speed data processing systems employ high-speed elements in the ordinary processing circuits thereof themselves. Meanwhile, the addition of address array portions which require high speed elements having a speed equivalent to that of said elements of an associative memory lead to very high production costs.

OBJECTS AND SUMMARY OF THE INVENTION

It is a primary object of the present invention to provide a method and system for operating an associative memory which enables an increase in the amount of data that can be retained in the associative memory, such as a buffer memory, with no substantial increase in the memory capacity of the address array portion.

It is a further object of the invention to provide a method and system for operating an associative memory which enables an increase in the amount of data that can be retained in the associative memory, such as a buffer memory, without changing the unit by which data is to be transferred between said memory and another memory, such as a main memory.

It is a still further object of the invention to provide a method and system for operating an associative memory which enables an increase in the amount of data that can be retained in the associative memory, such as a buffer memory, without complicating the construction of hardware, such as an address comparator.

It is another object of the invention to provide a method and system for operating an associative memory which permits increasing the amount of data that can be retained in the associative memory, such as a buffer memory, and which is inexpensive due to its simple construction.

In order to achieve the above mentioned objects, there is provided, according to the present invention, a method and system for operating an associative memory which is provided for storing information. The method includes the steps of extracting necessary information by access to said associative memory, and updating the information in said associative memory, said associative memory comprising a data portion for storing a plurality of block information units as one module, an address array portion for storing a module address corresponding to data of one said module, and a valid information portion arranged in conjunction with said module address for indicating which of said block information units constituting said one module is valid, whereby updating of information in said data portion is carried out in the block information units referred to above.

Further features and advantages of the present invention will be apparent from the ensuing description with reference to the accompanying drawings to which, however, the scope of the invention is in no way limited.

BRIEF DESCRIPTION OF THE DRAWINGS

FIG. 4 including FIGS. 4a and 4b is a block diagram illustrating one embodiment of the processing system for buffer memory according to the present invention;

DETAILED DESCRIPTION OF THE INVENTION

Figure 1:
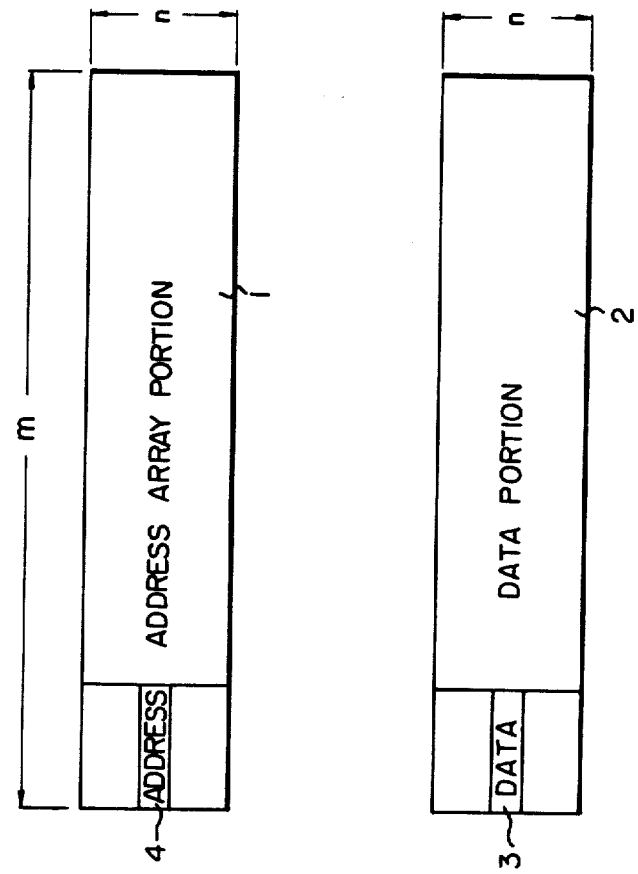
FIG. 1 is a block diagram illustrating the structure of a conventional buffer memory.

A conventional buffer memory comprises an address array portion 1 and a data portion 2, as illustrated in FIG. 1. Usually one block information unit 3 is transferred to the data portion 2 from the main memory and stored therein, while simultaneously a block address 4 is stored in the address array portion 2, which block address 4 corresponds to said block information unit 3 thus transferred and stored. Access address information is provided for access to said block information unit in the associative memory by a processor, not shown. Logically, when said address array portion 1 is retrieved, and when a block address 4 which also corresponds to said access address information is present in said portion 1, a corresponding block unit of data or information 3 is read out from said data portion 2. In the Set Associative System now widely in use, the value of "m" shown in the drawing is called a "set number", the value of "n" also shown therein is called an "associative level" and the size of one block unit of data 3 a "block size".

Figure 2:
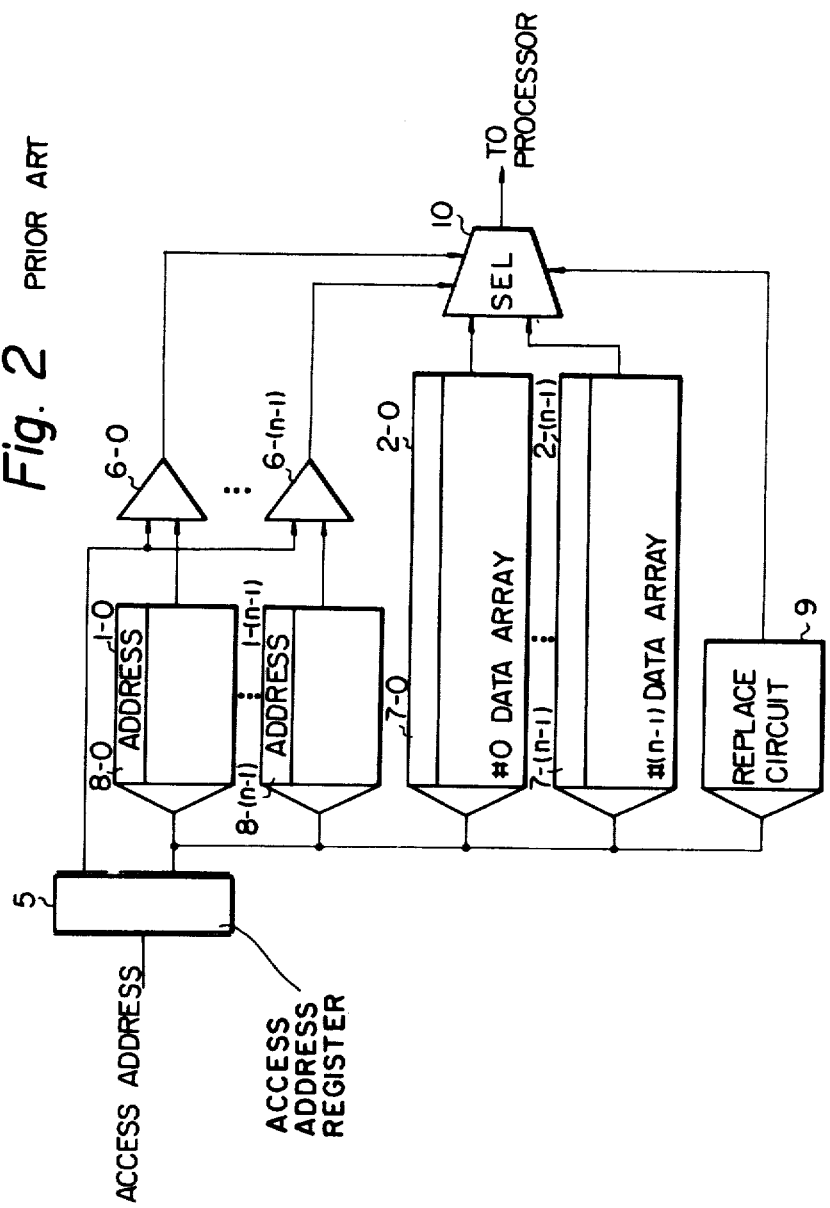
FIG. 2 is a block diagram illustrating an example of the conventional processing system for buffer memory.

FIG. 2 illustrates a conventional buffer memory processing system, in which numerals 1-0 through 1-(n−1) each denote one associative unit as a component of the address array portion 1 of FIG. 1, and numerals 2-0 through 2-(n−1) each denote one associative unit as a component of the data portion 2 of FIG. 1. The numeral 5 denotes an address register in which access address information is set, 6-0 through 6-(n−1) each denote a comparator circuit, 7-0 through 7-(n−1) each denote a block information unit corresponding to a block unit 3 illustrated in FIG. 1 and, 8-0 through 8-(n−1) each correspond to a block address 4 in FIG. 1, 9 denotes a replace circuit for extracting, during an updating process, one block unit out of the block information units least accessed in the last or a recent access operation, and 10 denotes a selecting circuit for extracting one of the block information units read out in parallel from the associative units 2-0 through 2-(n−1) of the data portion, according to an agreement signal from the comparator circuits 6-0 through 6-(n−1).

When access address information has been set in the access address register 5, access to associative units 1-0 through 1-(n−1) in the address array portion, to associative units 2-0 through 2-(n−1) in the data portion, and to the replace circuit 9, for example, with reference to the contents of the lower address portion of said access address information, is achieved. The block addresses 8-0 through 8-(n−1) stored in the associative units 1-0 through 1-(n−1) of the address array portion constitute the upper address portion of the address information corresponding to the block information units 2-0 through 2-(n−1). The block addresses 8-0 through 8-(n−1) are all simultaneously read out in said access operation and, are applied to the comparator circuits 6-0 through 6-(n−1), respectively. Simultaneously, the upper address portion of said access address information set in the access address register 5 is input to each of comparator circuits 6-0 through 6-(n−1), and each of said comparator circuits compares between inputs, and produces an output indicating agreement if and when the inputs agree with each other.

When the block information units 7-0 through 7-(n−1) are also all simultaneously read out from the data portion associative units 2-0 through 2-(n−1) in said access operation, and are delivered to the selecting circuit 10. If we suppose that the comparator circuit 6-0 produces an agreement output, the selecting circuit 10 as a result selects a block information unit 7-0 and transfers it to a processsor, not illustrated.

Incidentally, if the block information unit 7-0 has been selected as mentioned above in said access operation, the replace circuit 9 carries out updating of information so that the block unit 7-0 is of highest priority. If said access operation indicates that the desired block information unit is not present, a block information unit least recently used in the access operation is deleted from the buffer memory by the replace circuit 9, in accordance with an LRU (least recently used) algorithm for instance, and a necessary block information unit is transferred to the buffer memory from the main memory.

Figure 3:
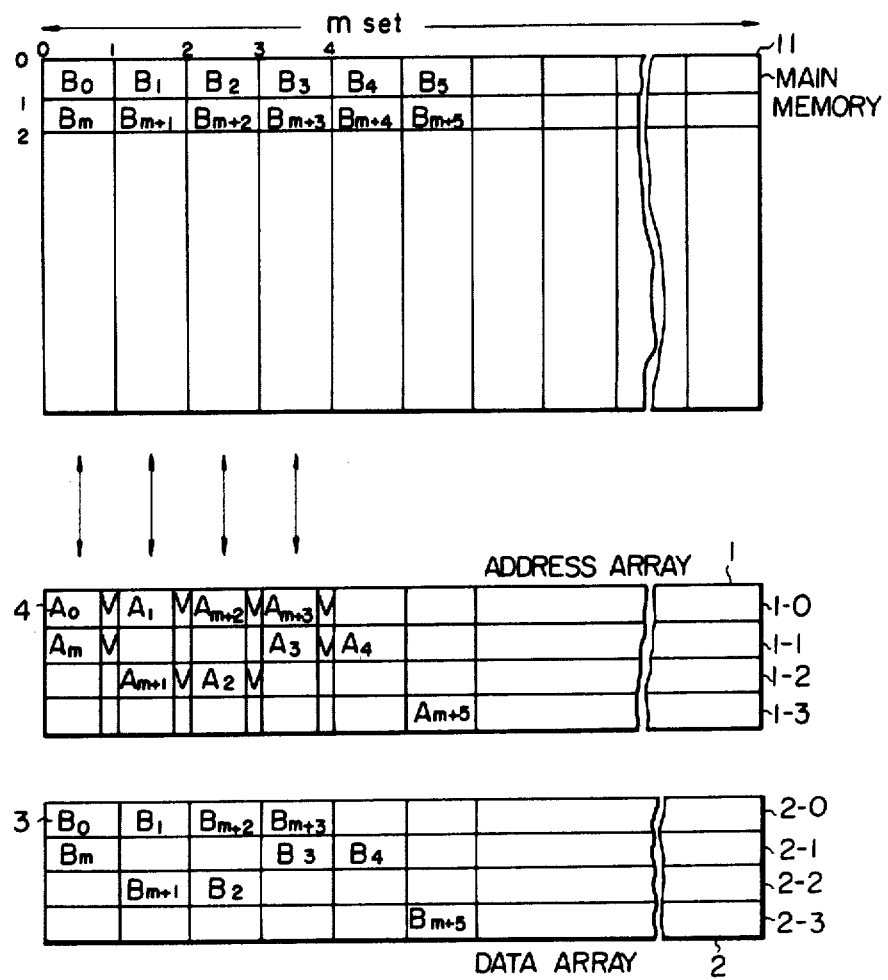
FIG. 3 is a block diagram illustrating the flow of information in the conventional buffer memory.

FIG. 3 illustrates the flow of information through the conventional system for processing information in a block information unit. In FIG. 3, numerals 1, 1-0 through 1-3, 2, 2-0 through 2-3, 3 and 4 correspond to identical numerals in FIG. 1 and FIG. 2. Reference numeral 11 denote the main memory, V valid information, and $B_0$, $B_1$ . . . ; $B_m$, $B_{m+1}$, . . . block information units. Information stored in main memory 11 is treated in block units, such as $B_0$, $B_1$, . . . ; $B_m$, $B_{m+1}$, . . . . In a Set Associative System, when block information units $B_0$, $B_1$, . . . , belonging to the zero set position of the main memory 11 are transferred to the buffer memory, they are transferred to and retained in the zero set position of the data portion of said buffer memory.

More specifically, in the illustrated case, block information unit $B_0$ is transferred to the associative unit 2-0 of the data portion 2, while block information unit $B_m$ is transferred to the associative unit 2-1 thereof. Further, the block address "0 0" of the block information unit $B_0$ has its upper address portion "0" written into the associative unit 1-0 of the address array portion 1, while the block address "1 0" of block information unit $B_m$ has its upper address portion "1" is written into the associative unit 1-1 of the address array portion 1. Respective units of valid information V are written in the address array portion 1 for indicating whether the block information units $B_0$, $B_m$, etc. transferred into the buffer memory are valid. That is, if the valid information V indicates a logical output "0", the corresponding block information unit, $B_0$ for instance, is processed as invalid.

According to the present invention, as illustrated in FIG. 4, a plurality of block information units are stored in the data portion as a single information unit. This corresponds to an increased block size as described with reference to FIG. 1. A block unit corresponding to a plurality of block information units as mentioned above will hereinafter be called "a module" or "module information unit" in the present invention.

Figure 4B:
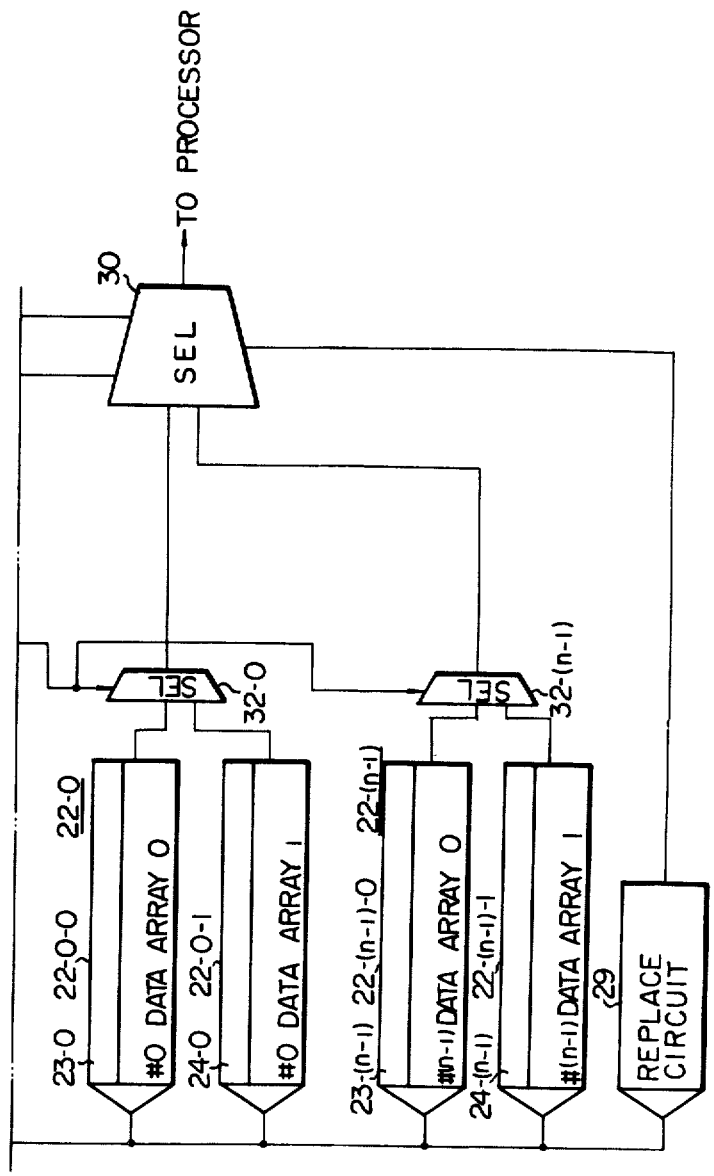

In FIGS. 4a and 4b, numerals 21-0 through 21-(n−1) indicate an associative unit as a component of an address array portion corresponding to that of FIG. 1, 22-0 through 22-(n−1) each indicate to an associative unit as a component of a data portion corresponding to that of FIG. 1, and 22-0-0, 22-0-1 through 22-(n−1)-0, 22-(n−1)-1 each represent a block information unit as a component of a module information unit corresponding to the block information unit 3 of FIG. 1. Furthermore, reference numeral 25 denotes an address register in which access address information is set, 26-0 through 26-(n−1) denote comparator circuits, 28-0 through 28-(n−1) indicate module addresses, 29 represents a replace circuit, 31-0 through 31-(n−1) denote and 32-0 through 32-(n−1) selecting circuits, and 33-0 through 33-(n−1) represent gate circuits.

When access address information has been set into the address register 25, said access address information has the upper address information thereof retained in register 25a, the module address information in register 25b, and the component block address information of the module retained in register 25b. When access address information has been set into the address register 25, access to the address array portion associative units 21-0 through 21-(n−1), the data portion associative units 22-0 through 22-(n−1), and the replace circuit 29 is achieved with reference to the contents stored in the lower address portions 25b and 25c. The module addresses 28-0 through 28-(n−1) stored in the address array portion associative units 21-0 through 22-(n−1) constitute the upper address portion of the address information corresponding to the illustrated module information units 22-0 through 22-(n−1). These module addresses 28-0 through 28-(n−1) are simultaneously read out by virtue of said access operation, and are delivered to the respective comparator circuits 26-0 through 26-(n−1). At that instant, the upper address 25a set in the address register 25 has been input to each of the comparator circuits 26-0 through 26-(n−1). Each comparator circuit compares its respective module address with the upper address 25a, and produces an output to indicate agreement if said two addresses agree with each other. The output from the comparator circuit is used to detect agreement relative to a block address in the module with the valid information, and the agreement output is delivered to the selecting circuit 30 (FIG. 4b).

Meanwhile, in the data array portion, the module information units 22-0 through 22-(n−1) are all read out simultaneously, and a selected block information unit, which is selected in the module information units 22-0 through 22-(n−1), is applied to the selecting circuit 30. The selecting circuit 30 selects a block information unit and transfers it to a processor, not illustrated.

Figure 5:
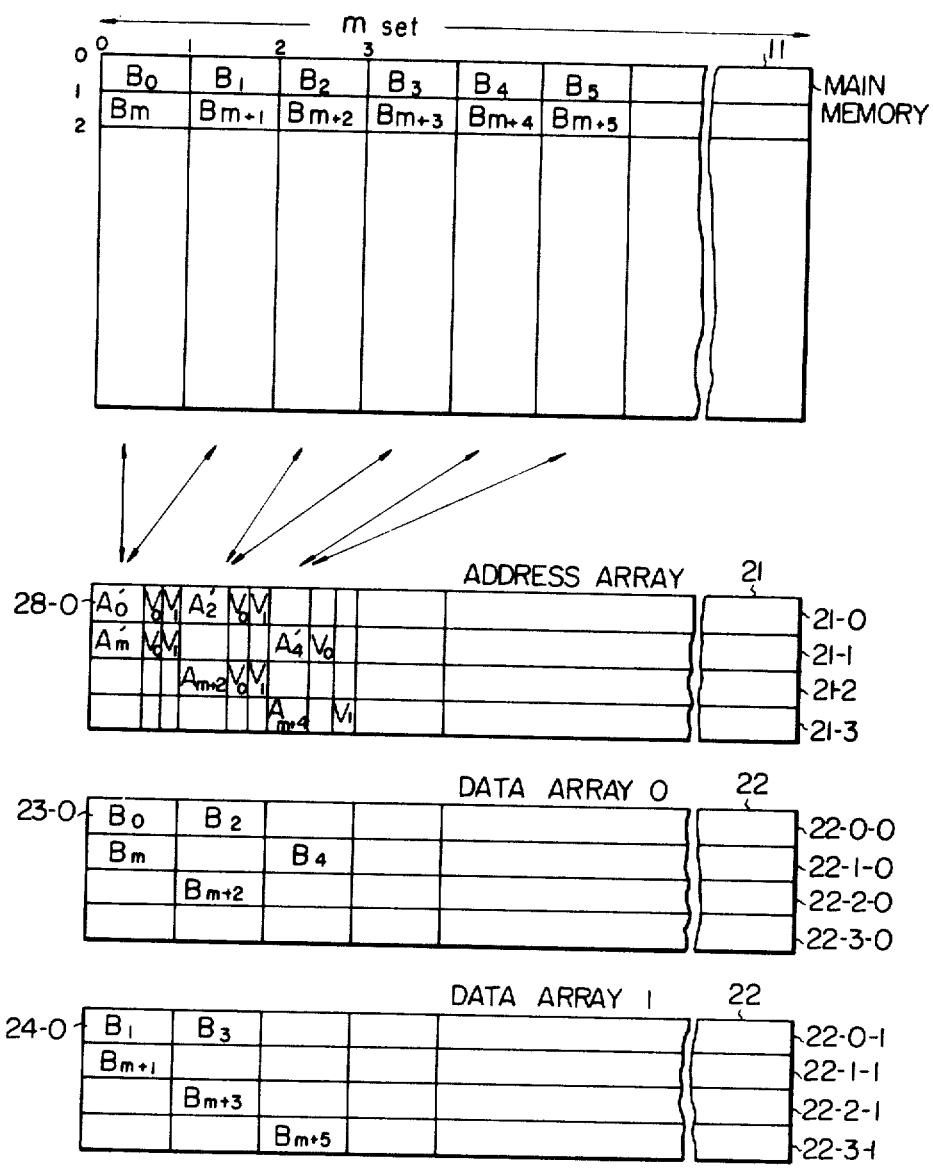
FIG. 5 is a block diagram illustrating the flow of information according to the method and system of the present invention.

FIG. 5 illustrates the flow of the information processed in a module unit by virtue of the method and system according to the present invention. Suppose now that block information units $B_0$, $B_1$, or the block information unit $B_0$ alone, are transferred to the associative unit 22-0 of the data array portion 22, and that the upper address array portion of the module address information corresponding to the module information unit including said block units $B_0$, $B_1$ is written into the corresponding associative unit 21-0 in address array portion 21. If the block information units $B_0$, $B_1$ are both proper and valid, the valid information $V_0$, $V_1$ are both shown by logical outputs "1" for instance, to indicate the validity of the block information units $B_0$, $B_1$. However, if said block information units $B_0$, $B_1$ are both transferred to the associative unit 22-0, and if only one of them (for example, the block information unit $B_0$) is valid, or if the block information unit $B_0$ alone is transferred thereto and is valid, the valid information $V_0$ provides a logical value "1" to indicate the validity of said unit, whereas the other valid information $V_1$ provides a logical value "0" to indicate invalidity. The other module units illustrated are also processed in the same manner as mentioned above.

In summary, as described with reference to FIG. 4, it can be considered that all address information including the valid informations $V_0$, $V_1$ are read out simultaneously from the associative units 21-0 through 21-3 of the address array portion 21 by using the lower address portion of the address register, and then, the upper address information thereof is compared with the upper address portion of the access address information. At that instant, even if the upper address information agrees with the upper address portion of the access address information, the comparator circuit 26 produces no agreement output if the valid information $V_0$ or $V_1$ indicates the invalidity of said information.

Figure 6:
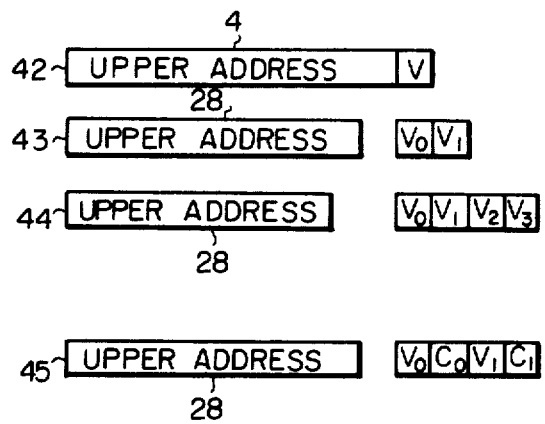
FIG. 6 is a diagram illustrating the format of information in the address array portion according to the system of the present invention.

Referring now to FIG. 6 et seq., a more detailed description will be presented regarding the method of processing and system according to the present invention, using the above-mentioned valid information $V_0$, $V_1$.

FIG. 6 is an illustration in detail of the information written in the address array portion 21 (FIG. 5). Numeral 42 (FIG. 6) indicates information written in the address array portion 1 (FIG. 3) in the case where the buffer memory handles information in block unit (that is, the conventional art), in which the numeral 4 denotes a block address, and the symbol V denotes valid information. Numeral 43 (FIG. 6) indicates information written in the address array portion 21 (FIG. 5) in the case where the buffer memory handles two block information units as one module, in which the numeral 28 indicates a module address corresponding to two block information units, and the symbols $V_0$, $V_1$ indicate units of valid information corresponding to said respective block information units. By this arrangement, the buffer memory can have a capacity twice as large as that of the conventional buffer memory with the same address array portion as the conventional buffer memory. Reference numeral 44 (FIG. 6) indicates information written in the address array portion 21 (FIG. 5) in the case where the buffer memory handles four block information units as one module, in which numeral 28 denotes a module address corresponding to four block information units, and $V_0$, $V_1$, $V_2$ and $V_3$ denote units of valid information corresponding to respective block information units. By this arrangement, the buffer memory can have a capacity four times as large as that of the conventional buffer memory with the same address array portion as the convention buffer memory. Numeral 45 (FIG. 6) indicates information written in the address array portion 21 in the case where the buffer memory handles two block units of information as one module and is also provided with change information as hereinafter described; numeral 28 denotes a module address corresponding to two block information units, and $V_0$ and $V_1$ indicate units of valid information corresponding to respective block information units, $C_0$ indicates a unit of change information which indicates that a block information unit (i.e., $B_0$ in the present case) corresponding to the information $V_0$ has been written, and $C_1$ denotes another unit of change information indicating that a block information unit (i.e., $B_1$) corresponding to the information $V_1$ has been written.

Figure 7:
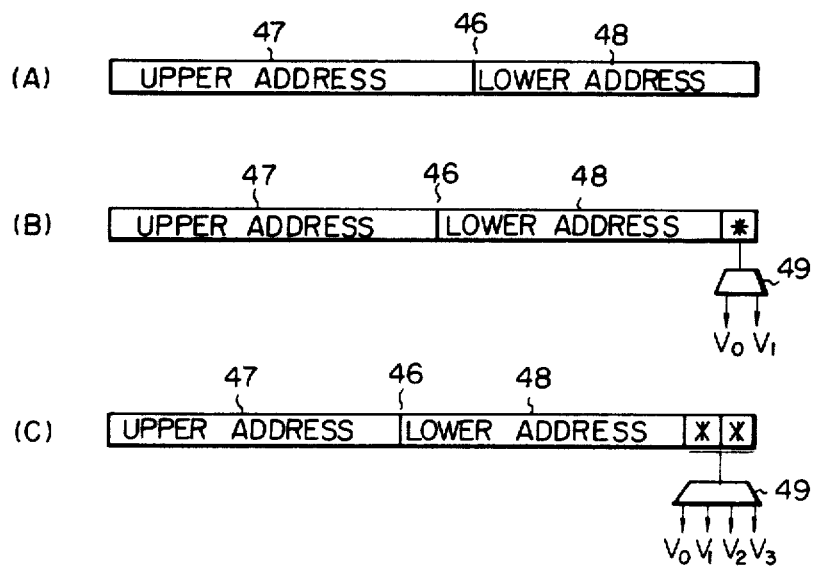
FIG. 7 is a diagram illustrating the format of the access address according to the system of the present invention.

FIG. 7 illustrates a manner in which access is carried out with reference to the access address information set in the address register 25 illustrated in FIG. 4. In the drawing, reference numeral 46 indicates access address information, 47 an upper address portion, 48 a lower address portion, 49 a decoder, and the bit with an asterisk FIG. 7(B) a bit for selecting a block information unit.

FIG. 7(A) illustrates a manner in which access is carried out in the case where the buffer memory handles a block unit individually (that is, per the prior art method and system). In this case, access to each of the associative units 1-0 through 1-(n−1) of the address array portion is achieved in the same manner as illustrated in FIG. 2, with reference to the lower address portion 48 of the access address information 46. By this access operation, the information 42 indicated in FIG. 6 is read out from each associative unit. Then, the block address 4 is compared with the upper address 47. Only when they agree with each other, and when the valid information V indicates validity, does the associated comparator circuit produce an agreement output.

FIG. 7(B) illustrates a manner in which access is achieved in the case where the buffer memory handles two block information units as one so as to double the buffer memory capacity. In this case, access to each of the associative units 21-0 through 21-(n−1) of the address array portion 21 is achieved as illustrated in FIG. 4, with reference to the lower address portion 48 of the access address information 46. By this access operation, the information 43 indicated in FIG. 6 is read out from each associative unit. Then, the module address 28 and the upper address portion 47 illustrated in FIG. 7(B) are compared with each other. If the bit with the asterisk indicates a logical output "0", a check is carried out as to whether the valid information $V_0$ in the information 43 indicated in FIG. 6 indicates validity. If the bit with 25 the asterisk indicates a logical value "1", a check is carried out as to whether the valid information $V_1$ in the information 43 of FIG. 6 indicates validity. As a result, if there is agreement between the module address and the upper address portion, and simultaneously, the two units of valid information both indicate validity, the associated comparator circuit 26-0, 26-(n−1) emits an agreement output signal.

FIG. 7(C) illustrates a manner of access in the case where the buffer memory handles four block information units as one module so as to have a quadrupled capacity. In this case, access to each of the associative units 21-0 through 21-(n−1) of the address array portion 21 is carried out in the same manner as illustrated in FIG. 4, with reference to the lower address portion 48 of the access address information 46. Consequently, the information 44 indicated in FIG. 6 is read out from each associative unit, followed by a comparison between the module address 28 and the upper address portion 47 of FIG. 7. A check is carried out as to whether the valid information $V_0$ indicates validity if the bit with the asterisk indicates "0 0", whether the valid information $V_1$ indicates validity if said bit indicates "0 1", whether valid information $V_2$ indicates validity if said bit indicates "1 0", and whether the valid information $V_3$ indicates validity if said bit indicates "1 1". As a result of this, only when said comparison shows agreement, and when all of said valid information indicate validity, does the corresponding comparator circuit 26-0, 26-(n−1) produce an agreement output signal. As for the information 45 indicated in FIG. 6, this information will be hereinafter referred to.

During the above-mentioned access operations, in the event that the desired data can not be read out from the buffer memory, the module information unit least accessed in the last access operation is extracted and deleted from the buffer memory by using the replace circuit 29 indicated in FIG. 4. In return, a mass of data which was required in said access operation is supplied from the main memory 11 (FIG. 5) and loaded into the buffer memory.

When the data is loaded into the buffer memory, according to the present invention, only one block information unit is loaded into the buffer memory instead of loading one whole module information unit thereinto at one time, so as to keep the buffer memory in a less busy (memory busy) state. More specifically, in the case illustrated in FIG. 5 for instance, suppose that the module information 23-0, 24-0 have been deleted, and that other module information units 23-k, 24-k (not shown) containing a block information unit $B_{k1}$ (not shown) are to be loaded. In such case, the required block information unit $B_k$ alone is loaded into the associative unit 22-0 of the data portion 22 illustrated in FIG. 5. At the same time, the upper address "k" of the module address 28-k, corresponding to said module information unit, is written into the associative unit 21-0 of the address array portion 21. If said block information unit $B_{k1}$ is located in a block unit which corresponds to the valid information $V_1$ with respect to the module information units 23-k, 24-k, the valid information $V_1$ is set to indicate validity, whereas the other valid information $V_0$ is set to indicate invalidity. Then, in the even that another block information unit $B_{k0}$ in the same module information units 23-k, 24-k is required, said block information unit $B_{k0}$ is loaded into the associative unit 22-0 of the data portion 22, and the valid information $V_0$ is set to indicate validity. It should, of course, be understood that said loading of the other block information unit $B_{k0}$ can be effected only when access to the main memory 11 (FIG. 5) is temporarily interrupted.

In the above-mentioned manner of loading, the frequency of the memory busy states can be largely decreased. Further, with regard to the fact that one module information unit is retained in the buffer memory, when valid information Vi corresponding to one block information unit of said module information unit indicates invalidity of said block information unit, and when access to said invalid block information unit has been achieved, process control is achieved based on a control table (not shown in the drawing). That is, if a block information unit identical to said invalid block information unit has been supplied from the main memory, two or more identical block information units do not exist together in the data portion.

It has been stated above that in updating, that is, in loading new data into the buffer memory from the main memory 11, only the block information unit $B_{k1}$ which is required is previously loaded into the buffer memory, so as to reduce the memory busy states. However, it has not yet been stated that, in the event that a module information unit in the buffer memory has been subjected to an exchange with new information, the written or old data is transferred to the main memory 11. It should be noted, however, that, if the so-called Store Through System is employed, the written or old data need only be transferred to the main memory in an information unit equal to the block information unit with respect to which the data has been exchanged, or in a lower information unit. In addition, even if the buffer memory is processed in a module information unit, as in the present invention, the frequency of occurrence of "memory busy" will not increase. However, in the so-called SWAP System, in which data in the buffer memory is transferred to the main memory 11 at the time it becomes necessary to delete said data, it is necessary to transfer a whole module information unit equivalent to a plurality of block information units so that, with the SWAP System, the possibility of memory busy state occurring will decrease.

If the above-mentioned SWAP System is employed, the above-mentioned problem with this system can be settled by providing change information $C_0$, $C_1$, etc. among the information written in the address array portion 1, such being indicated as information 45 in FIG. 6. To be more specific, if the SWAP System is employed, and if an exchange of data in the buffer memory has been carried out, the change information Ci is updated to provide a logical value "1" (for instance), indicating the block information unit, the data of which has been exchanged. Furthermore, in an updating operation, when one module information unit is deleted from the buffer memory, only the block information unit in said module information unit being deleted, with respect to which the change information Ci is then producing a logical output "1", is transferred to the main memory 11 and stored therein.

By processing as described above, it is unnecessary to transfer to the main memory 11 the other block information units not subjected to writing or exchange of data in deleted module information unit. As a result, the transfer time is curtailed by the time required for transfer of said other block information units, and the possibility of occurrence of "memory busy" is reduced.

Figure 8:
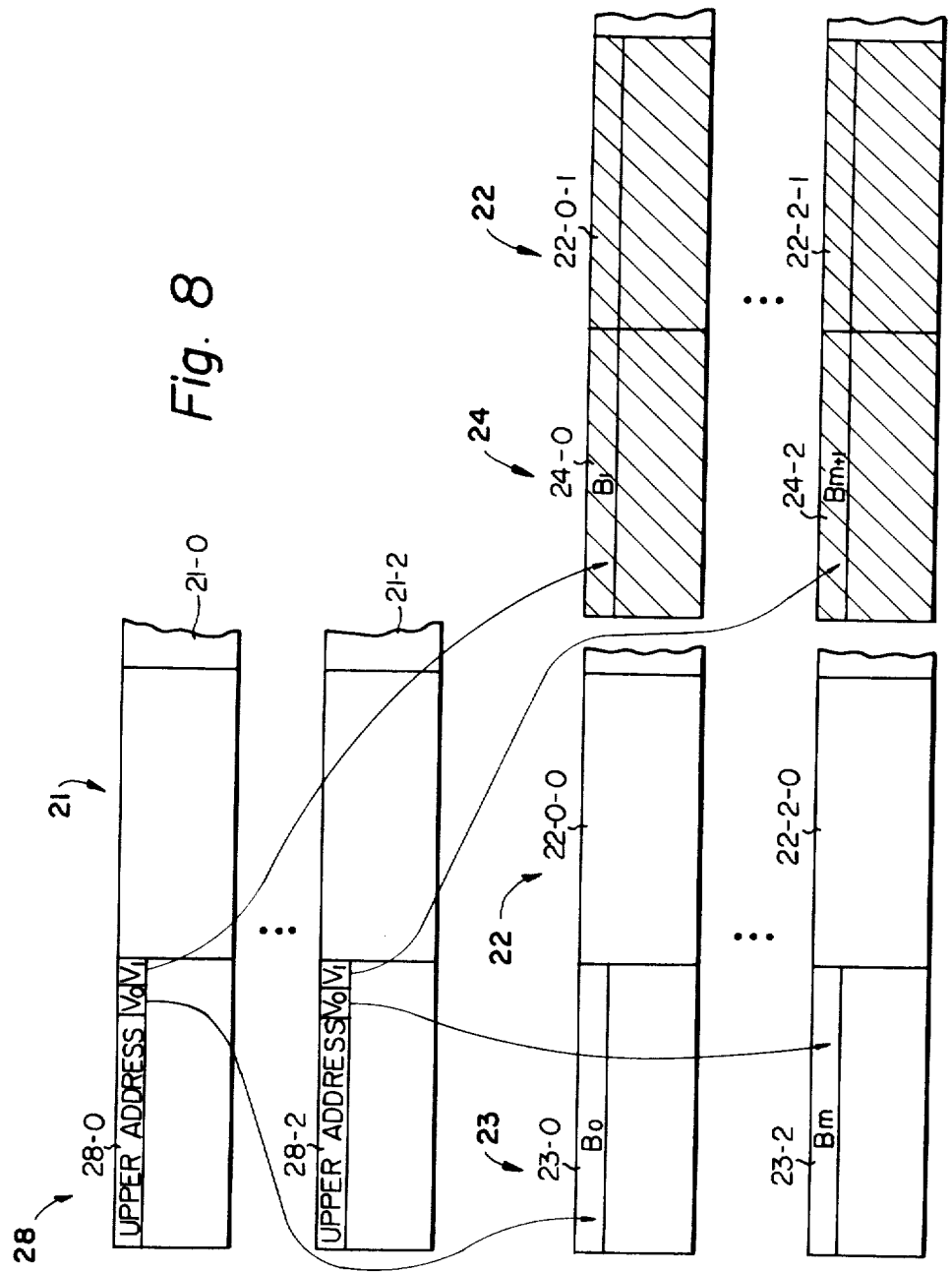
FIG. 8 is a diagram illustrating the relationship in memory capacity between the data array portion and the address array portion.

As shown in FIG. 8, according to the present invention, while the data portion 22 constituting the buffer memory has been increased in storage capacity, there is no increase in the storage capacity of the address array portion 21. (It should be noted that the symbols used in FIG. 8 correspond to those used in FIG. 5). More specifically, the module addresses 28 written in the address array portion 21 indicate the presence of a plurality of block information units 23-0, 24-0, etc., and the valid information $V_0$, $V_1$ indicate whether the plural block information units 23-0, 24-0, etc. are actually present. As is evident from the information 42, 43, 44 indicated in FIG. 6, even though the amount of valid information has increased, the module addresses have a smaller number of bits. Thus, there is no change in the capacity of the address array portion 21 (FIG. 8).

As explained above, according to the present invention, it is feasible to increase the amount of data storable in an associative memory, such as a buffer memory, without any substantial increase in the memory capacity of the address array portion, and also, without the necessity of substantially changing the unit in which data are transferred between the buffer memory and other memories, such as the main memory. Further, additional hardware, such as a comparator circuit and a replace circuit, is not necessary. It should be noted that the units of information used throughout the specification, that is, the information units which are termed "block information unit" and "module information unit", are reciprocal designations with respect to each other. Therefore, the designation "module information unit" may be optionally changed to "block information unit" and the designation "block information unit" may accordingly be changed to "information unit".

Numerous modifications and adaptations of the system and method of the invention will be apparent to those skilled in the art and thus it is intended by the appended claims to cover all such modifications and adaptations which fall within the true spirit and scope of the invention.

What is claimed is:

1. A method of operating an associative memory provided for storing information in a data processing system, said method comprising the steps of:

extracting necessary information by means of access to said associative memory and to updating information retained in the associative memory, providing said associative memory with a data portion for storing a plurality of block information units as one module information unit, and an address array portion for storing a module address corresponding to said one module information unit, providing said associative memory further with valid information arranged in conjunction with said module address in said address array portion for indicating which of said plural block information units constituting said one module information unit is valid, providing an address for retrieving block information units from said associative memory, said address including a first field for accessing said address array portion, a second field for enabling a comparing means to compare the content of said second field with said address read out from said address array portion, and at least one significant bit for allotting valid information of said block information units, whereby to obtain an increased capacity for said associative memory, and updating said plurality of block information units stored in said data portion as said one module information unit.

2. The method of operating an associative memory as claimed in claim 1, further comprising the step of providing a main memory, and wherein said associative memory is a buffer memory which previously stores information delivered from main memory, said method further comprising the steps of providing an associated processor, operating said associative memory with said associated processor by adapting said associative memory to be accessed by said associated processor, and said step of updating of information comprises transferring new data in block information units from said main memory.

3. The method of operating an associative memory as claimed in 2, wherein said address array portion contains, in addition to said valid information, change information arranged in conjunction with said module address for indicating whether a given block information unit corresponding thereto has been updated, and said step of updating of information comprises returning said given block information unit to said main memory when said change information indicates that said given block information has been updated.

4. The method of operating an associative memory as claimed in claim 1, further comprising the step of providing a main memory, wherein said address portion contains, in addition to said valid information, change information arranged in conjunction with said module address for indicating whether a given block information unit corresponding thereto has been updated, and said step of updating of information comprises returning said given block information unit to said main memory when said change information indicates that said given block information has been updated.

5. A system for operating an associative memory provided for storing information in a data processing system, said associative memory comprising a data portion for storing a plurality of block information units as one module information unit, and an address array portion for storing a module address corresponding to said one module information unit, said associative memory storing updating information, and further storing valid information arranged in conjunction with said module address in said address array portion for indicating which of said plural block information units constituting said one module information unit is valid; said system comprising:

means for accessing said updating information stored in said associative memory so as to extract necessary information, means for providing an address for retrieving block information units from said associative memory, said address including a first field for accessing said address array portion, a second field for enabling a comparing means to compare the content of said second field with said address read out from said address array portion, and at least one significant bit for allotting valid information of said block information units, whereby to obtain an increased capacity of said associative memory, and means for updating said plurality of block information units stored in said data portion as said one module information unit.

6. The system of claim 5, further comprising:

a main memory, said associative memory being a buffer memory which previously stores information delivered from said main memory, and an associated processor operated in cooperation with said associative memory so that said associative memory is accessed by said associated processor, wherein said means for updating said plurality of block information units transfers new data in block information units from said main memory.

7. The system of 6, wherein said address array portion contains, in addition to said valid information, change information arranged in conjunction with said module address for indicating whether a given block information unit corresponding thereto has been updated, and wherein said means for updating said plurality of block information units returns said given block information unit to said main memory when said change information indicates that said given block information unit has been updated.

8. The system of claim 5, further comprising a main memory, wherein said address array portion contains, in addition to said valid information, change information arranged in conjunction with said module address for indicating whether a given block information unit corresponding thereto has been updated, and wherein said means for updating said plurality of block information units returns said given block information unit to said main memory when said change information indicates that said given block information unit has been updated.

* * * * *

UNITED STATES PATENT AND TRADEMARK OFFICE
CERTIFICATE OF CORRECTION

PATENT NO. : 4,244,033
DATED : January 6, 1981
INVENTOR(S) : Hattori

It is certified that error appears in the above—identified patent and that said Letters Patent is hereby corrected as shown below:

Front page, [57] Abstract, line 16, "units" should be --unit--;
line 23, after "information" insert --units--.

Column 1, line 5, "FIELD OF THE INVENTION" should be (centered) --BACKGROUND OF THE INVENTION
1. Field of the Invention--;
line 13, "BACKGROUND OF THE INVENTION" should be --2. Description of the Prior Art--;
line 41, "usually," should be --usually--.

Column 3, line 21, after "level"" insert --,--;
line 22, after "data 3" insert --is called--;
line 33, "and," should be --,--;
line 56, "operation and," should be --operation, and--;
line 61, after "between" insert --the--;
line 67, "and" should be --they--.

Column 4, line 21, "denote" should be --denotes--;
line 38, delete "is";
line 57, delete "to";
line 68, delete "denote".

Column 5, line 1, before "selecting" insert --denote--;
line 6, after "information" insert --retained--.

UNITED STATES PATENT AND TRADEMARK OFFICE
CERTIFICATE OF CORRECTION

PATENT NO. : 4,244,033
DATED : January 6, 1981
INVENTOR(S) : Hattori

It is certified that error appears in the above—identified patent and that said Letters Patent is hereby corrected as shown below:

Column 7, line 30, ", and" should be --and,--;
          line 59, "can not" should be --cannot--.
Column 8, line 20, "even" should be --event--;
          line 52, "that," should be --that--.

Signed and Sealed this

Thirteenth Day of October 1981

[SEAL]

*Attest:*

GERALD J. MOSSINGHOFF

*Attesting Officer*     *Commissioner of Patents and Trademarks*